United States Patent
Dolev et al.

(10) Patent No.: US 10,949,326 B2
(45) Date of Patent: Mar. 16, 2021

(54) METHOD AND SYSTEM FOR TESTING AND CHECKING THE CORRECTNESS OF A COMPUTER PROGRAM DURING RUNTIME

(71) Applicant: B. G. NEGEV TECHNOLOGIES AND APPLICATIONS LTD., AT BEN-GURION UNIVERSITY, Beer Sheva (IL)

(72) Inventors: Shlomi Dolev, Omer (IL); Amit Rokach, Beer-Sheva (IL); Roman Manevich, Rehovot (IL)

(73) Assignee: B.G. NEGEV TECHNOLOGIES AND APPLICATIONS LTD., Beer Sheva (IL)

( * ) Notice: Subject to any disclaimer, the term of this patent is extended or adjusted under 35 U.S.C. 154(b) by 0 days.

(21) Appl. No.: 15/724,312

(22) Filed: Oct. 4, 2017

(65) Prior Publication Data
US 2018/0196732 A1  Jul. 12, 2018

Related U.S. Application Data

(60) Provisional application No. 62/404,229, filed on Oct. 5, 2016.

(51) Int. Cl.
*G06F 11/36* (2006.01)
*G06F 9/54* (2006.01)
*G06F 9/455* (2018.01)

(52) U.S. Cl.
CPC ...... *G06F 11/3612* (2013.01); *G06F 9/45558* (2013.01); *G06F 9/545* (2013.01);
(Continued)

(58) Field of Classification Search
CPC .. G06F 11/3612; G06F 9/45558; G06F 9/545; G06F 11/3664; G06F 2009/45562;
(Continued)

(56) References Cited

U.S. PATENT DOCUMENTS 5,754,760 A * 5/1998 Warfield ............. G06F 11/3676
714/35
6,412,106 B1 * 6/2002 Leask ................. G06F 11/3664
714/E11.217

(Continued)

OTHER PUBLICATIONS

Mera et al, "Integrating Software Testing and Run-Time Checking in an Assertion Verification Framework", [Online], 2009, pp. 1-19, [Retrieved from internet on Mar. 22, 2019], <http://oa.upm.es/14304/1/HERME_ARC_2009-1.pdf> (Year: 2009).*

(Continued)

*Primary Examiner* — Geoffrey R St Leger
*Assistant Examiner* — Zengpu Wei
(74) *Attorney, Agent, or Firm* — Roach Brown McCarthy & Gruber, P.C.; Kevin D. McCarthy (57) ABSTRACT

The present invention is directed to a method and system for testing, during runtime, the correctness of a computer program (such as a hypervisor, an operating system or an interpreter) that controls a system and has one or more software modules. Accordingly, a reflexive code of a reflex function is integrated into the software modules or into a virtual infrastructure that executes the computer program. Whenever desired, the reflexive code is activated by an input and its corresponding output is processed. Then, the correctness of the one or more software modules or of the computer program is determined according to the processing results.

15 Claims, 2 Drawing Sheets

```
Class class1
{
    variables...
    methods...
    returnType Reflex()
    {
        ...
        implementation
        ...
    }
    ...
    implementation
    ...
}
```

(52) U.S. Cl.
CPC ............... *G06F 11/3664* (2013.01); *G06F 2009/45562* (2013.01); *G06F 2009/45575* (2013.01); *G06F 2009/45579* (2013.01); *G06F 2009/45591* (2013.01)

(58) Field of Classification Search
CPC . G06F 2009/45575; G06F 2009/45579; G06F 2009/45591
USPC ........................................................ 717/124
See application file for complete search history.

(56) References Cited

U.S. PATENT DOCUMENTS

| | | | | |
|---|---|---|---|---|
| 6,892,324 | B1* | 5/2005 | French | G06F 11/3636 714/38.14 |
| 7,084,992 | B1* | 8/2006 | Amarger | G06F 3/1296 358/1.13 |
| 7,788,657 | B2* | 8/2010 | Wannamaker | G06F 8/4434 717/158 |
| 7,873,951 | B1* | 1/2011 | Bissett | G06F 8/436 717/151 |
| 9,276,774 | B2* | 3/2016 | Manser | H04L 12/66 |
| 10,754,701 | B1* | 8/2020 | Wagner | G06F 9/5077 |
| 2004/0205704 | A1* | 10/2004 | Miller, Jr. | G06F 11/3612 717/109 |
| 2008/0010432 | A1* | 1/2008 | Kasuya | G06F 9/4843 711/202 |
| 2008/0056223 | A1* | 3/2008 | Manser | H04L 12/66 370/342 |
| 2008/0133977 | A1* | 6/2008 | Chun | G06F 11/3664 714/38.11 |
| 2008/0134176 | A1* | 6/2008 | Fitzgerald | G06F 9/45537 718/1 |
| 2012/0252441 | A1* | 10/2012 | Fujimoto | H04M 1/24 455/425 |
| 2012/0260344 | A1* | 10/2012 | Maor | G06F 11/3688 726/25 |
| 2013/0132063 | A1* | 5/2013 | Rieschl | G06F 11/3624 703/28 |
| 2014/0223238 | A1* | 8/2014 | Allen | G06F 11/3612 714/38.1 |
| 2014/0282433 | A1* | 9/2014 | Eilam | G06F 11/3688 717/131 |
| 2015/0128132 | A1* | 5/2015 | Pohlmann | G06F 9/45533 718/1 |
| 2015/0154097 | A1* | 6/2015 | Duda | G06F 11/3688 714/38.1 |
| 2017/0344459 | A1* | 11/2017 | Horesh | G06F 11/3644 |

OTHER PUBLICATIONS

Condit et al, "Unifying Type Checking and Property Checking for Low-Level Code", [Online], 2009, pp. 302-314, [Retrieved from internet on Nov. 13, 2020], <https://dl.acm.org/doi/pdf/10.1145/1594834.1480921> (Year: 2009).*

Chen et al, "Combining Model Checking and Testing for Software Analysis", [Online], 2008, pp. 206-209, [Retrieved from internet on Nov. 13, 2020], <https://ieeexplore.ieee.org/stamp/stamp.jsp?tp=&arnumber=4722035> (Year: 2008).*

Brunet et al, "Design Tests: An Approach to Programmatically Check your Code Against Design Rules", [Online], 2009, pp. 1-4, [Retrieved from internet on Nov. 13, 2020], <https://www.researchgate.net/profile/Dalton_Serey/publication/221554218_Design_Tests_An_Approach_to_Programmatically_Check_your_Cod> (Year: 2009).*

* cited by examiner

```
Class class1
{
    variables...
    methods...
    returnType Reflex()
    {
        ...
        implementation
        ...
    }
    ...
    implementation
    ...
}
```

Fig. 3

```
Class monitor implements ActionListener
{
    variables...
    methods...
    void actionPerformed(ActionEvent e)
    {
        ...
        Implementation
        ...
    }
    ...
    implementation
    ...
}
```

Fig. 4

METHOD AND SYSTEM FOR TESTING AND CHECKING THE CORRECTNESS OF A COMPUTER PROGRAM DURING RUNTIME

FIELD OF THE INVENTION

The present invention relates to the field of software program testing. More specifically, the present invention is related to a method and system for testing and checking the correctness of a computer program during runtime.

BACKGROUND OF THE INVENTION

Software verification is a discipline of software engineering whose goal is to assure that software fully satisfies all the expected requirements by of testing, debugging and correctness checking of computer programs. There are mainly two types of verification: (1) Dynamic verification which is based on testing and experimentation and (2) Static verification, which is based on code analysis.

Dynamic (run time) verification is performed during the execution of software, and dynamically checks its behavior. The aim of software dynamic verification is to find the errors introduced by an activity (for example, having a medical software to analyze bio-chemical data); or by the repetitive performance of one or more activities (such as a stress test for a web server, i.e. check if the current product of the activity is as correct as it was at the beginning of the activity).

Static (compilation time) verification is the process of checking that software meets requirements by inspecting the code before it runs.

Verification by Analysis

The analysis verification method applies to verification by investigation, mathematical calculations, logical evaluation, and calculations using conventional methods or accepted general use computer methods. Analysis includes sampling and correlating measured data and observed test results with calculated expected values to establish conformance with requirements.

Many algorithms and techniques were developed to tackle the dynamic verification task over the years. One example of these techniques is the family of the widely accepted snapshot techniques, which are used to collect a global state of a system and check the consistency of the system according to given predicates, possibly correcting the global state or rolling back to a previously stored snapshot. One of the main drawbacks of these techniques is the fact that the corresponding executable and the environment are not checked in a holistic manner.

Even though, formal verification methods using existing ad-hoc process of testing and debugging are very useful there are cases in which they cannot exhaustively check all scenarios. Also, they are not designed to be used in runtime where the assumptions on the dynamic environment, such as hardware, hypervisors (a hypervisor is a function which isolates operating systems and applications from the underlying computer hardware for allowing the underlying host machine hardware to independently operate one or more virtual machines as guests), etc., which can unexpectedly change over time.

There are also cases in which existing verification methods are not effective, with respect to simple begin-end outcomes or run-time values. For instance, a simple loop can easily be determined whether it has an end or not, and if it achieves the purpose it has been written for.

Figure 1:
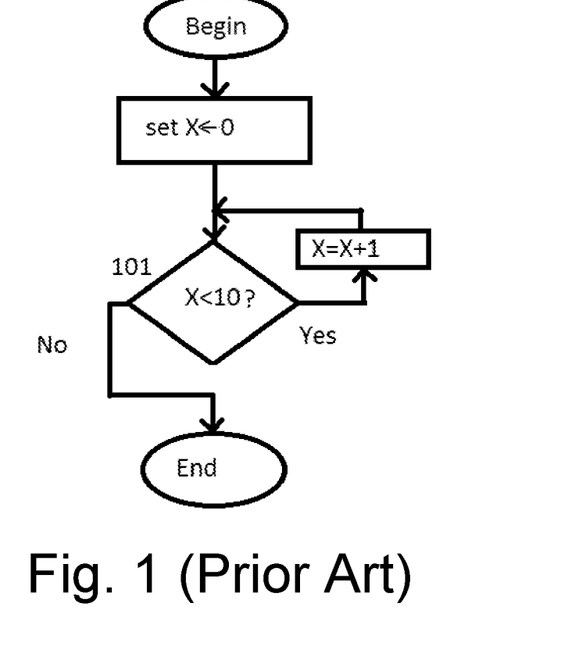
FIG. 1 (prior art) schematically illustrates a flow chart of a primitive loop that count to 10.

FIG. 1 schematically illustrates a flow chart of a primitive loop that counts to 10. Loops like that usually used to repeat the same action with slight changes, filling an array, for example. This loop has only one junction 101 with two possible choices ("true" or "false") and simple stop conditions and therefore, this loop is very easy to test. However, the verification of more complex structures, such as classes (in object-oriented programming, a class is a template definition of the methods and variables in a particular kind of object), pre-written external programs and modern applications is much harder and in some cases, almost impossible, to determine. An exemplary case is when a new version of MS-Windows™ is being tested. A test-case is designed to check some of Word™ attributes, import objects from other MS-Office™ programs, perform a print (either to PDF file or to a paper printer) and finally exit with (or without) saving the document, has a malfunction in one or more of the "junctions" and it causes a trap in an infinite loop of calling other programs that eventually call the first program (MS-Word™) and so forth.

Figure 2:
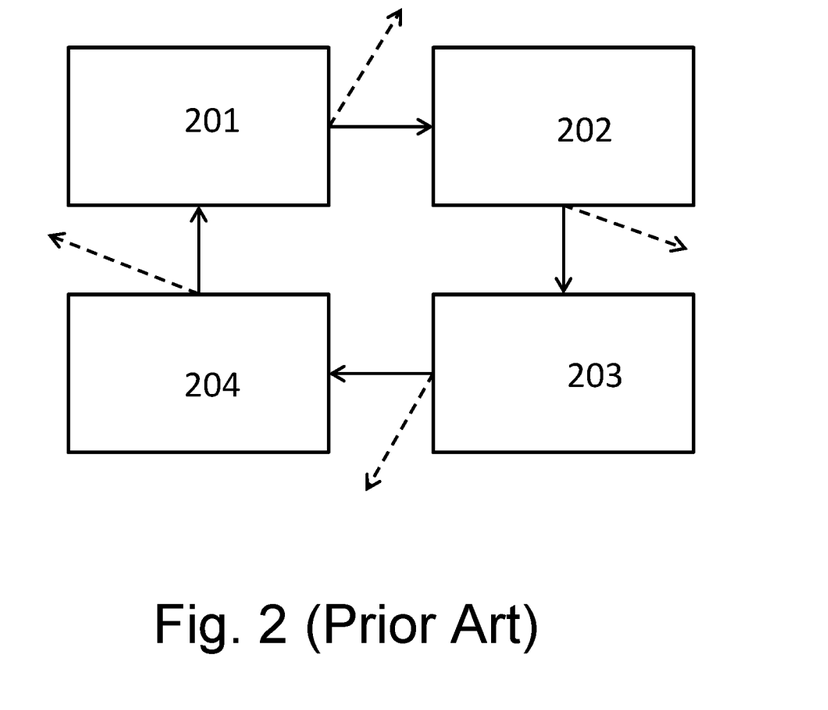
FIG. 2 (prior art) schematically illustrates an infinite loop between objects.

FIG. 2 schematically illustrates an infinite loop between objects. The solid arrows represent the pre-selected path of the test case. The dashed arrows represent other possible routes. If the path leads from 201 to 202, from 202 to 203, from 203 to 204 and then again to 201 and so on, it may never reach the end of the path. In such a case, the test will never reach its end point, and therefore will not generate the requested output to be checked. Furthermore, this kind of infinite loops also causes an overload on the system's resources (RAM free space or CPU power) in addition to time consumption.

It is therefore an object of the present invention to provide a method for testing and checking the correctness of a computer program (i.e., an executable) during runtime, without interrupting the normal operation of the system that is controlled by the program.

It is another object of the present invention to provide a method for testing the state and the computational environment of a system that is controlled by a program, without influencing the execution flow.

It is a further object of the present invention to provide a method for testing and checking the correctness of a computer program which is performed automatic or on-demand.

Other objects advantages of the present invention will become clear as the description proceeds.

SUMMARY OF THE INVENTION

The present invention is directed to a method for testing, during runtime, the correctness of a computer program (such as a hypervisor, an operating system or an interpreter) that controls a system and has one or more software modules. Accordingly, a reflexive code of a reflex function is integrated into the software modules or into a virtual infrastructure that executes the computer program. Whenever desired, the reflexive code is activated by an input and its corresponding output is processed. Then, the correctness of the one or more software modules or of the computer program is determined according to the processing results.

Testing and checking the correctness of a computer program may be performed automatically or on-demand.

In one aspect, a single reflexive action may perform a reactiveness check for the entire system as a whole. A system state may be set of values defining the system at any point in time.

In one aspect, whenever a reflex request is made, obtrusive testing may be made by replicating the program environment and running the reflex function on the replica.

In one aspect, integrating a reflexive code may be made by injecting hooks into the code and on-demand introducing a reflex function at the injection points.

In one aspect, forming an abstraction layer between the kernel and the program, to be controlled and duplicated, may be formed by:
  a) configuring a first container to mimic the environment of the program, to generate a clone environment;
  b) redirecting the inputs and outputs to be controlled and examined by a second container, monitoring the system I/O;
  c) upon receiving a reflex request, replicating the system state to a different container; and
  d) activating a reflex function on the clone, while resuming the running of the original container.

In one aspect, orchestration testing may be done by controlling the flow of input/output to the tested parts of a program and activating a reflex function to check a specific subsystem for different input/output pairs, for detecting erroneous states.

In one aspect, the state of an object or a thread may be accessed and then duplicating the object or thread and testing the correctness of the object or a thread by activating a reflexive function on the duplicate object or thread.

Whenever a reflexive action is requested, the following steps may be performed:
  a) halting and replicating the running container and any running process inside the container;
  b) creating a new container to run the replica, while replacing I/O channels from the original container to prevent the replica from changing the original program environment.

The present invention is also directed to a system for testing, during runtime, the correctness of a computer program that controls a system and having one or more software modules, which comprises:
  a) an Injection Module for performing the instrumentation of the program and for adding reflexive capabilities, to generate an instrumented code;
  b) an Execution Module for receiving the instrumented code to the which will run the program alongside a Reflex Monitor Module;
  c) An Injection Module for defining reflex to be inserted at a predetermined place within the computer program or the one or more software modules;
  d) an execution module, for running the computer program on the host system using all local configurations, such that reflex actions are unobtrusive to the computer program;
  e) A reflex monitor module for separating the input arrival from the functionality by listening to the reflex request and performing the requested reflexive actions; and
  f) a verification module for checking the correctness of user defined reflexive functions by producing reflexive functions according to formal specification of the computer program as an automata.

Reflexive functions may be detected by looking for execution loops in the program. The functions or objects to be injected by the injection module may be determined by adding a Java compilation annotation directive, or by listing the injection points in a file which will be later passed to the injection module.

DETAILED DESCRIPTION OF THE INVENTION

The present invention proposes a method and system for testing and checking the correctness of a computer program (i.e., an executable) during runtime, without interrupting the normal operation of the system that is controlled by the program. The present invention provides a framework that bypasses the main computation center and returns an almost automatic response from a local cluster.

The proposed framework shares the same global monitoring motivation as snapshots (copies of the virtual machine's disk file at a given point in time) and allows active monitoring, while considering the computational environment (e.g. the operating system, a virtual machine, a container) and allows holistic testing of the executable, the state and the computational environment without influencing the execution flow. This active monitoring operates like biological reflexes that bypass the brain in biological systems and therefore may be considered as program reflexes, which are pieces of code that are added to the program's code and are configures to provide on-demand indications regarding normal operation of segments of a program. For example, if a user does not receive emails for a while, he may send email to himself to check that the email system functions properly.

The on-demand unobtrusive testing framework using reflexes can be even further generalized and be used to create an on-demand reflexable set of algorithms and data structures. The proposed framework can be integrated into any developers' tool set into the compilation chain and can test, either on-demand or in an automatic manner, and verify the internal state and operation of the program. This on-demand feature allows testing the program (or part of it) only when an immediate need is presented, which considerably reduces overheads.

Object Systems

The following sets are defined:
O Objects
M Methods
T Thread identifiers
V Values
Cop Client operations (In object-oriented programming, a method is a programmed procedure that is defined as part of a class and included in any object of that class. A thread is placeholder information associated with a single use of a program that can handle multiple concurrent users).

Definition 1: Action

An action $a=(t,)\in A$ is either a client operation, a method call, or a method return whose first component, denoted $t=tid(a)$, is the thread identifier that executes the action:

$Ac \equiv \{(t,c) | t \in T, c \in Cop\}$ $Am \equiv \{(t,\text{call } o.m(n)) | t \in T, o \in O, m \in M, n \in V\} \cup$ $\{(t,\text{ret}(n)o.m) | t \in T, o \in O, m \in M, n \in V\}$ $A \equiv Ac \cup Am$

Definition 2: Trace

A trace $\tau \in A^*$ is a finite sequence of actions. The concatenation of two traces $\tau$ and $\tau'$ is denoted by $\tau\tau'$ and the action at position i by $\tau_i$.

Definition 3: Sequential Trace

The set of completed traces, denoted Compl, consists of traces where every method call is immediately followed by a matching return. The set of sequential traces, denoted Seq, consists of completed traces, possibly followed by an unclosed method call.

Seq::=Compl|Compl(t,call $o.m(n)$)

Compl::=$s$|Step Compl

Step::=$(t,c)|(t,\text{call } o.m(n))(t,\text{ret}(n)o.m)$

Definition 4: Projection

The projection of a trace $\tau$ on a thread identifier $t \in T$, denoted $\tau|t$, is the subsequence of $\tau$ comprised of actions associated with t. The projection of a trace $\tau$ on an object $o \in O$, denoted $\tau|o$, is the subsequence of $\tau$ comprised of actions associated with o. Both definitions can be naturally lifted to sets of threads and sets of objects.

Definition 5: Well-Formed Traces

A trace $\tau$ is well-formed if it is sequential for every thread identifier:

WTrace$\equiv\{\tau | \forall t \in T \cdot \tau | t \in$ Seq$\}$.

Definition 6: History

Histories are traces consisting solely of method calls and returns Hist$\equiv Am^*$. Well-formed histories are defined accordingly: WHist$\equiv$Hist$\cap$WTrace

Definition 7: Object System

An object system OS$\subseteq$WHist is a set of well-formed histories.

Definition 8: Module

A set of objects M$\subseteq$OS is a module of an object system OS if its histories are also histories of OS: $\forall H \in$OS $\cdot h|_M \in$OS. The set of histories of a module, denoted by Spec(M), is called its specification.

Definition 9: Objects and Threads of Traces

The function GetObj:WTrace$\to 2^O$ is defined, which returns the set of objects appearing in a trace $\tau$, as follows:

$$GetObj(\tau) \equiv \begin{cases} \emptyset, & \tau = \varepsilon; \\ \{o\} \cup GetObj(\tau'), & \tau = \text{call } o \cdot m(n) \cdot \tau; \\ \{o\} \cup GetObj(\tau'), & \tau = \text{ret}(n) \, o \cdot m \cdot \tau; \\ GetObj(\tau'), & \tau = (t, c) \cdot \tau'; \end{cases}$$

The functions GetThrds:WTrace$\to 2^T$ and GetMthds:WTrace$\to 2^M$ are also defined, which return the set of threads appearing in a trace and the set of methods appearing in a trace, respectively, in a similar way. These functions are overloaded with their natural lifting to sets of traces.

Definition 10: Environment Object

The environment object env$\in$O is designated to encapsulate all the effects of client operations. This object is completely separated from the object system and is usually inaccessible from it. Meaning, given object system OS, env $f \notin$GetObj(OS).

Linearizability

Linearizability is a correctness condition for concurrent objects (a concurrent object is a data object shared by concurrent processes) that exploits the semantics of abstract data types. It permits a high degree of concurrency, yet it permits programmers to specify and reason about concurrent objects using known techniques from the sequential domain. Linearizability provides the illusion that each operation applied by concurrent processes takes effect instantaneously at some point between its invocation and its response, implying that the meaning of a concurrent object's operations can be given by pre- and post-conditions.

Definition 11: Happens Before Order

If H$\in$WHist be a well-formed history, then Hi happens before Hj in H, denoted Hi$<_H$ Hj, if the following holds:

$\exists i \le i' \le j' \le j$.

(Hi' is a return action)$\land$(Hj' is a call action)$\land$
tid(Hi)=tid(Hi')$\land$tid(Hj')=tid(Hj).

Intuitively, this means that the method call of $H_i$ is completed before the method call of $H_j$.

Definition 12: Weak Equivalence

Two well-formed histories H,H'$\in$WHist are weakly-equivalent if their projects to threads are equal:

$\forall t \in T \cdot H | t = H' | t$.

Definition 13: History Linearizability Relation

A well-formed history $H^r$ is a linearization of a well-formed history H, denoted $H^r \pm H$, if they are weakly-equivalent and there exists a permutation $\Pi: \{1 \ldots |H|\} \to \{1 \ldots |H'|\}$ such that the following holds:

$(\forall i \cdot Hi = H' \land (\forall i < j \cdot Hi <_H Hj \Rightarrow H_{\Pi(i)} <_H H_{\Pi(j)})$.

Definition 14: Object System Linearizability Relation

An object system OS is linearizable with respect to an object system OS', denoted OS$\subseteq$OS', if the following holds:

$\forall \tau \in$OS$\cdot \exists \tau' \in$OS'$\cdot \tau \subseteq \tau'$.

Transition Relations and Trace Semantics

Definition 15: States

States are defined as a function which receives the objects of the system and returns values that represent the system state
States: $O \to V \cup \bot$, where $\bot$ stands for an error value.

Definition 16: Environment Object

The environment object, $\in O$ is designated, to capture the effect of client operations. It is required that the object not be visible to an object system. That is, for every object system OS, it is required that $f \notin \text{GetObj}(OS)$ holds.

Definition 17: Transition Relation

A transitio-relation expresses how actions change states TR: $A \to (\text{States} \times \text{States})$. A transition due to action a is denoted as $\sigma \xrightarrow{\tau} \sigma'$. The transition relation is lifted to well-formed traces TR: WTrace$\to$(States×States) by sequentially composing the transition relations of its actions. A transition due to trace $\tau$ is denoted as $\sigma \xrightarrow{\tau} \sigma'$.

Definition 18: Programs

The set of all client programs is denoted by P. A program P∈P is abstractly represented by the set of all traces it takes part of. The (unconstrained) semantics of a program denoted P by a set of traces, denoted GetTrcs(P).
The semantics of a program P relative to an object system is defined as the transitional relation it induces in the object system. The semantic of P relative to an object system is denoted via the function $[[P]](OS) = \{(\sigma,\sigma') \mid \exists \tau \in \text{GetTrcs}(\mathcal{P}) \cap OS \wedge \sigma \xrightarrow{\tau} \sigma'\}$ where $\sigma \xrightarrow{[[P]](OS)} \sigma'$ if $(\sigma, \sigma') \in [[P]](OS)$.

Definition 19: Observational Refinement

An object system OS observationally refines an object system OS' if $\forall P \in P, \sigma \in \text{States}$.

$\{\sigma' (\text{env}) \mid \sigma \xrightarrow{[[P]](OS)} \sigma'\} \subseteq \{\sigma' (\text{env}) \mid \sigma \xrightarrow{[[P]](OS')} \sigma'\}$.

Definition 20: Observational Equivalence

Two object systems OS and OS' are observationally equivalent if each of them observationally refines the other.
Theorem 1 (Filipovic et al. "Abstraction for Concurrent Objects", Theor. Comput. Sci., 411(51-52):4379-4398, 2010):
If $OS_C$ is linearizable with respect to $OS_A$, then $OS_C$ observationally refines $OS_A$.
Reflexive Object Systems
A reflex $\rho \in \text{WHist} \cap \text{Compl}$ as a completed history satisfying a desired property. It is desired to define ways to enhance an object system OS with additional capabilities, resulting in a reflexive object system ROS, which is observationally equivalent to OS. To obtain ROS, methods and objects are added:

$\text{GetMthds}(ROS) = \text{GetMthds}(OS) \cup M\rho$ $\text{GetObj}(ROS) = \text{GetObj}(OS) \cup O\rho$ Next, different types of reflexes are defined, which can be used for testing the implementation of an objects system.
Test Reflexes
One use case of reflexes is to test modules during runtime. Intuitively, this is done by performing a sequence of method invocations, inspecting the returned values, and checking that they satisfy the specification.

Definition 21: Identity Reflex

A reflex $\rho$ is an identity reflex if the transitional relation it induces is the identity relation. That is, $\forall \sigma \in \text{States}. \sigma \xrightarrow{\rho} \sigma'$
The trivial case is a reflex which activates no action, but informative reflexive actions can be formed.
In certain cases, requiring that a reflex will not affect the state can be too restrictive. To overcome this, abstraction is used to distil the essential information contained in states.

Definition 22: Congruence Reflex

A generalization of identity reflexes is defined with respect to a state abstraction function $\alpha$: States$\to$D for a finite set D, which is referred to as the abstract domain. Two states $\sigma$, $\sigma' \in \text{States}$ are $\alpha$-congruent, denoted $\sigma \sim_\alpha \sigma'$, if $\alpha(\sigma) = \alpha(\sigma')$. A reflex $\rho \in \text{WHist}$ is an $\alpha$-congruence reflex if for every state $\sigma$, $\sigma' \in \text{WHist}$ where $\sigma \xrightarrow{\rho} \sigma'$, and $\sigma \sim_\alpha \sigma'$ holds.
ATM Example
This example examines the pseudo-code of an ATM (Automated Teller Machine or more commonly known as a cash machine).
ATM machine embedded software is separated (either for protection or for easier maintenance) into 4 modules: a card reader module, a user accounts management module, a bill dispenser module and the money deposit slot module. These modules also have sub-systems and each module is in charge of different aspects, such as hardware, communications, database management, etc.
One Reflexive action that can be considered is an action which requires all of the modules of the ATM to work together, thereby offering a re-activeness check for the entire system as a whole.
An example of such a Reflexive action could be the following action sequence B:
(I) pausing all actions;
(II) simulating entering a card (fictional card);
(III) taking out 10 dollars;
(IV) depositing them back into the user account (fictional user account);
(V) simulating removing the fictive card;
(VI) resuming all actions.
The execution of action sequence B preserves the states of all the different modules of the machine. This entails that all balances are kept the same, the amount of money in the ATM is the same and none of the resources are depleted.
Action sequence B allows checking of the ATM's systems and will indicate whether the ATM is functional enough to draw money from.
In this example, the state is an abstract set of values defining the system at any point in time. Furthermore, the division into modules is adapted to facilitate the proving process and could have been done on a lower resolution.

Action sequence B requires all of the defined modules to work together, which allows for a holistic check of the system. If any of the modules encountered an internal problem, the whole operational chain would be corrupted and there will be no way of predicting the outcome. This behavior presents another problem—it will not be possible to differentiate the faulty modules from the functional modules.

In order to solve this problem and verify the correctness of a specific internal part of the system, it is possible to take two approaches. The first approach is to define more refined Reflexive actions and to infer from the disjuncture of a few tests which are the malfunctioning modules. The second approach is to reduce the granularity of the tests. This means that modules of the system and their mutual interaction will be tested, rather than testing the entire system as a single monolithic module.

In order to use the second approach, in which each of the modules is checked individually, it is required to start by defining correctness predicates for each of the subsystems (the term subsystem is used loosely, since a subsystem can also be the functionality associated with one line of code) and augment their code in such a way that will allow the individual checks. In the example of the ATM, it is possible to produce the desired predicate checks of the card reader module by simulating an insert of a fictional card and then checking if the module is ready to be used again. The actual checking cannot be done by using the API of the card reader module and it is required to add a signal. In this case it is possible to add a flag that indicates whether a module can be used.

Printer Example

Another example used to build intuition concerning the nature of the framework is the printer system presented in Algorithm 1. The printer is able to receive documents from multiple clients. The documents are concatenated (in FIFO ordering) at the end of an externally accessible buffer in an atomic manner by using Algorithm 2. Concurrently, the printer draws all the pages of the first document in the buffer, one page at a time, and puts them in an internal buffer (it is assumed that the printer is able to identify the document it currently reads and to notice when the last page of the document is reached). The pages are then printed to the out-feed pile one by one.

The atomic behavior is required in order to prevent mixed documents from being printed and this is ensured by using a mutual exclusion mechanism to prevent more than one client from submitting documents concurrently.

A problem arises when a client submits a job and the printer appears to be non-reactive, meaning it does not print any pages, neither the clients' nor otherwise. The client cannot be sure whether the printer is stuck due to an internal problem or it is busy reading a long document (which might not even be the clients' document) into its internal buffer.

Algorithm 3 shows a reflexive function that enables forcing the printer to show signs of life if it is functioning well. Since the most likely scenario which will require a reflex to be called is the scenario where the execution is in the reading loop of Algorithm 1 (9-14), the addition of a single page document at the head of the buffer will stop the reading loop, therefore providing an immediate indication of the well-being of the system. This addition does not change the behavior of the printer if it is anywhere else in its code.

If the printer is functioning well it should print everything it read from the document up until now, print a single test page, go back to reading from the buffer and continue with the normal printing order.

Algorithm 1: Printer Example

```
 1  typedef Page
 2  typedef Sheet
 3  operation pageToSheet: Page → Sheet
 4  var outpages: Page* ← Ø
 5  var buffer: Sheet* ← Ø
 6  Procedure Printer
 7  while true do
 8      inner buffer ← Ø
 9      while buffer = p · P ∧ p is not end of document do
10          holdPrinterBuffer( )
11          inner buffer ← inner buffer · p
12          buffer ← P
13          releasePrinterBuffer( )
14      end
15      while inner buffer = p · P do
16          outpages ← outpages · pageToSheet(p)
17          inner buffer ← P
18      end
19  end
```

Algorithm 2: Client Submit Algorithm

```
1  Procedure Submit(doc)
2  holdPrinterBuffer( )
3  while doc = p · P ∧ p f= s do
4      buffer ← buffer · p
5      doc ← P
6  end
7  releasePrinterBuffer( )
```

Even though this behavior gives an indication of the reactiveness of the printer's systems, as well as any status information printed on the test page it also introduces a change to the implied API of the printer. Within the printed pages of the long document there will be a test page that should be later removed.

In order to be able to remove the test page later on, it is assumed that the uniqueness of the T P document, i.e., it is assumed that the T P page does not exist in any other document and as such it is easily recognized and removed from the printed document.

The system before the addition of the reflexive ability is denoted as PRT and the system after the addition as R-PRT.

Proposition 1: PRT and R-PRT are Observationally Equivalent.

In order to show the above, the object set of the system is first defined.

Algorithm 3: Reflexive Printer Example

```
1  Procedure Reflex holdPrinterBuffer( )
2  buffer ← T P · buffer // T P is a test page.
3  releasePrinterBuffer( )
```

$O_{R-PRT}=\{$Client-Objects,env,Printer $P$,Reflex-Object $R\}$ $O_{PRT}=\{$Client-Objects,env,PrinterP$\}$ A set of states of the system is defined as States and say that for state $\sigma \in$ States $$\sigma(o) = \begin{cases} \text{queue locations of } ors \text{ document,} & o \text{ client object} \\ \text{complete-order-of-documents,} & o = env \\ 0, & o = R \\ -1, & \text{Otherwise} \end{cases}$$

the state looks at the out-feed pile, internal buffer and the external buffer and returns the place in line (printed and unprinted yet) of the documents.

Under this definition it can be seen that PRT and R-PRT are observationally equivalent, i.e., as the env object sees the system ($\sigma$(env)) the same set of states can be reached by applying a trace $\tau$ in both systems (in PRT it is a projection to PRT, meaning $\tau|O_{PRT}$).

Proposition 2: The Defined Reflexive Action is an $\alpha$-Congruent Reflex.

An abstraction function a is defined, which takes the States of the system and (1) removes any T P documents and changes the states of client objects by (2) unifying document locations of previously separated parts of documents and (3) fixes the locations in queue of the documents so that there will be only no-holes sequence. This provides a new state which completely does not contain the reflexive T P documents and in which all documents are listed in the queue. This definition allows seeing that the defined reflex is $\alpha$-congruent reflex.

This construct of proof can be repeated in most reflexive systems. In some systems it is only needed to prove the linearizability relation between the reflexed system and the original one and use Theorem 1 (proven by Filipovic et al.) to instantly have the observational equivalence.

In order to take this route, it is possible to have defined the methods of the object systems as the contents of the functions (disregarding holdPrinterBuffer and releasePrinterBuffer), for example, method Submit would have started at line 3 and ended at line 6. Then, it is possible to examine a trace $\tau \in$ WHist of the system and notice that the mutual exclusion system that guards buffer ensures a completely sequential execution. This in turn allows showing the linearizability relation between the systems.

Sequential Stack

The final example is a stack (stack is a linear data structure which follows a particular order in which the operations are performed). A stack o can be represented by a sequence of values, which is denoted as $\bar{u}$. The following transition relations are defined for the stack methods push and pop:

pop$^\dagger$:

$$\bar{u} \xrightarrow{(t,\text{call } o.\text{push}(v))} v \cdot \bar{u}$$

$$\bar{u} \xrightarrow{(t,\text{ret(true) } o.\text{push})} \bar{u}$$

$$\bar{u} \xrightarrow{(t,\text{call } o.\text{pop}())} \bar{u}$$

$$v \cdot \bar{u} \xrightarrow{(t,\text{ret}(v) o.\text{pop})} \bar{u}$$

$$\epsilon \xrightarrow{(t,\text{ret}(\bot) o.\text{pop})} \bot$$

The set of identity reflexes are given by the language of the following grammar:

$$R \to (t, \text{call } o.\text{push}(c))(t,\text{ret(true)}o.\text{push})R \| (t, \text{call } o.\text{pop}())(t,\text{ret}(c)o.\text{pop})$$

where c is Natural, $t \in T$
$R \to RR$
$R \to \epsilon$

An example of such a reflex is the one pushing the value 7 and popping it back: (t, call o.push (7))·(t, ret(1) o.push)·(t, call o.pop( )))·(t, ret(7) o.pop).

Proposition 3. The histories given by the language of the grammar above are identity reflexes.

This proposition is fairly trivial since the way the language is defined is by making sure that the values that stay in the stack after applying a reflex are the same values.

Reflexive Mutual Exclusion Construct

In this section focuses on a core distributed algorithm and show ways to add reflexes. The addition of reflexes in the following examples is based on some interactivity (time restrictions) and synchronicity requirements.

The Mutual Exclusivity Problem

The capabilities of reflexes are demonstrated by presenting a solution to a fundamental synchronization problem, the mutual exclusion problem. Since this problem is prominent in many concurrent systems, this solution will allow scaling the reflexive ability to such systems while also demonstrating how a package of reflexive algorithms and data structures can be designed.

It is assumed that the system contains two concurrently running groups of processes, Producers and Consumers, both performing operations on a shared resource which provides two predicate functions that indicates if resources can be consumed or be produced and pushed into it.

Algorithm 4 shows a busy—wait loop based implementation of these processes:

| Algorithm 4: Simple Consumer - Producer Algorithms |
| --- |
| 1   Procedure Consume |
| 2   while shared_set.Cant consume( ) do-nothing |
| 3   shared_set.Consume( ) |
| 4   Procedure Produce |
| 5   while shared set.Cant produce( ) do-nothing |
| 6   shared_set.P roduce( ) |

Simultaneous access to the shared resource must be prevented, in order to prevent an erroneous execution. One example of such an erroneous execution is a situation in which the system contains two Consumer objects and only one object in the shared object that can be consumed. Both Consumers fail the while loop condition (Procedure Consume line 2) concurrently which causes both to try and consume. One of the processes consumes the object while the second process causes an unexpected behavior.

A possible solution of these problems is to protect the shared resource by using a mutual exclusion algorithm to support synchronization among the Producers and the Consumers. One of the most famous mutual exclusion algorithms is the well-studied Bakery algorithm (Lamport's bakery algorithm is a computer algorithm which is intended to improve the safety in the usage of shared resources among multiple threads by means of mutual exclusion) which promises mutual exclusion as well as deadlock freedom.

The Bakery algorithm (Algorithm 5) primitives are used in Algorithm 6 to produce new Producer and Consumer algorithms that keep the correctness of the shared set. A process (either Consumer or Producer) will first try to enter the Bakery, activate its main functionality (called the critical section) and then it will try to leave.

---
Algorithm 5: Lamport's Bakery Algorithm 1  var entering ← boolean[1...n]
2  var numbers ← integer[1...n]
3  Procedure Bakery enter(i)
4  entering[i] ← true
5  numbers[i] ← 1 + max{numbers}
6  entering[i] ← false
7  for j{1 ... n}    while entering[j] do-nothing
8      while (numbers[j] ≠ 0)
9      ∧ (numbers[j] < numbers[i]) do-nothing
10 Procedure Bakery_leave(i)
11 numbers[i] ← 0
---

---
Algorithm 6: Mutually Exclusive Producer - Consumer

1  Procedure Producer(i)
2  Bakery_enter(i)
3  shared_set.P roduce( )
4  Bakery_leave(i)
5  Procedure Consumer(i)
6  Bakery_enter(i)
7  shared_set.Consume( )
8  Bakery_leave(i)
---

Even though this mutual exclusion structure is proven to be correct, in the case where a process repeatedly fails in its critical section, the Bakery algorithm will be in a deadlocked state preventing any other process from entering the critical section.

This poses a problem to an outside observer who will not be able to differentiate between several situations that yield a long response time of the system (on the time scale related to the observable user interaction time). An example of such scenarios can be a situation where many processes try to gain access to the Bakery algorithm on the one hand and a consistent failure in a critical section of one of the processes on the other, both of which cause the response time of the system to be fairly slow.

The inability to differentiate long execution from a stuck one becomes much more critical in an application where an entrance of a process to the critical section is expected to be within some real time period from the request of the process and the requests are not frequent. The sparsity of the requests makes it much more critical to verify that when a request is eventually made, the time restriction be respected. A reflex action may be used periodically to ensure the well-functioning of the mutual-exclusion based producer-consumer, with no side effects.

The Reflex Solution

Just as in the printer example a trivial reflexive solution can be added to the Bakery Algorithm (Algorithm 7).

---
Algorithm 7: Trivial Bakery Reflex

1  Procedure Trivial Reflex
2  Bakery enter(reflex)
3  Report all is well( )
4  Bakery leave(reflex)
---

Although this solution is correct, it lacks the immediacy expected from a reflexive action. The process will activate the Bakery enter( ) and Bakery leave( ) functions just as any other task and its critical section will be to check the state of the Bakery and report that it is well.

---
Algorithm 8: Reflexive Bakery Algorithm 1  var M ← Bakery
2  var taken ← false
3  var reflex ← false
4  Procedure Enter(i)
5  M.bakery enter(i)
6  M.Peterson entry(i)
       //Regular critical section
7  Procedure Leave(i)
8  M.Peterson leave(i)
9  M.bakery leave(i)
10 Procedure Priority enter(i)
11 M.Peterson enter(i)
       //Priority critical section
12 Procedure Priority leave(i)
13 M.Peterson leave(i)
---

---
Algorithm 9: Priority Reflexive Task

1  Procedure Reflex
2  priority enter(r)
3  Report all is well( )
4  priority leave(i)
---

Instead, the present invention proposes the following modification to the bakery API. Algorithm 8 uses the Bakery as a black boxed algorithm and builds a new synchronization mechanism that allows a reflexive process to enter with priority (just like the concatenation of the test page in the printer example).

A call to Priority enter by a reflex task will cause the system to give precedence to the reflex process and allow it to enter the reflex critical section before any other task, that plans to start the entry section of the Bakery enters its own critical section.

The present invention proposes to nest a mutual exclusion algorithm for two (types of processors, regular and reflex) processors, e.g., the classic and simple two processes version of Peterson algorithm with entry section after the entry section of the Bakery algorithm and leave before the leave section of the Bakery algorithm, where the reflex process tries to enter directly to the inner (e.g., Peterson) algorithm, while the rest enter both. The reflexive approach mentioned above requires a time heuristic—when a reflex action is called, a timer is activated before the call to Priority enter to check if the reflexive process takes longer than a certain threshold to gain access to the critical section.

This threshold can be changed to reflect the need of the system to be interactive or be inferred using any heuristic suited to the application. If the process takes too long to gain access to the critical section the timer will alert the caller of the reflex that the Bakery is probably stuck.

The modified algorithm can be used to make the producer-consumer problem reflexive by using the same Producer/Consumer tasks presented in Algorithm 6 and the reflex task presented in Algorithm 9.

Generalizing the Reflex Functions

The solutions presented so far are unique to their respective problems and require a fair bit of work from the designer of the system. The solutions require defining the desired modules by their functionality (as opposed to syntactically) and the appropriate reflexive functions for each (as well as proving their correctness).

The present invention proposes generalizing the concept and provide a testing framework into which the program will be loaded. The framework proposed by the present invention forms a control layer between the environment and the program much like a virtual machine hypervisor and will be able to simulate changes to the environment. When a reflex request is made, the framework will replicate the program environment and run the reflex function on the replica (or a different input sequences on each of the replicates). This concept is very similar to the concept of sandboxing (a sandbox is an isolated computing environment in which a program or file can be executed without affecting the application in which it runs) and will allow the reflex to become as obtrusive as necessary for thorough testing without harming the original program. This sandboxing technique also helps to reduce the work of the developer to define unobtrusive tests.

Intuitively, this idea allows testing the system under any input sequence without thinking of the consequences caused to the system. Unfortunately, most (if not all) programs interact with their environment in a way that is hard to isolate and mimic in a mock environment.

Code Instrumentation

Instrumentation is the ability to inject code into an already written (or even partially compiled, as the case with Java Bytecode) code in order to change the functionality or the behavior of the code.

Since the most prominent example is Java Bytecode instrumentation, it can be considered as a proof of concept example even though this capability exists in other programming languages, as well. Insertion of code in Java is done via Bytecode Instrumentation which is the injection of code during the loading of compiled Java code (Bytecode—is computer object code that is processed by a program, usually referred to as a virtual machine, rather than by the hardware processor) to the operating environment (JVM—A Java Virtual Machine). The injection itself is done by writing a Java Agent object which is used by the JVM to load the Bytecode from a file format to the internal structures of the JVM. Rewriting such an Agent allows inspecting and injecting code into the loaded Bytecode. Many manuals and assisting packages exist to write Java Agents and Bytecode but it was found that the ASM framework (ASM is a Java bytecode manipulation and analysis framework that can be used to modify existing classes or dynamically generate classes, directly in binary form) and a GitHub (GitHub is a web-based version-control and collaboration platform for software developers) hosted profiling agent example to be particularly useful to start from.

This ability can be utilized to inject hooks into the code which will allow the ability to on-demand introducing a reflex function at the injection points. This is a function that needs to be implemented (either naturally or automatically by a smart compiler) in each object (thread, process, class etc.) that wishes to enable the capability of reflexivity. This function can report the inner state of the object without changing it, or it can fix the state, depending of the result of the reflex check. This function should be fast and as unobstructive as possible so that the reflex action will not create an overhead on the run-time.

This solution requires extensive understanding of the code and design specific injection points and reflex functions. The requirement of intimate understanding of the code makes it much less of a development time efficient option and will most likely be used in a case of legacy code testing rather than a comprehensive framework.

Lightweight Containers

A container is a logical environment created on a computer where an application can run. The container and its guest application are abstracted from the underlying host computer's hardware resources/processors, memory, storage and so on and are logically isolated from other containers.

A lightweight container virtual machine system, like Docker (Docker is an open source software platform to create, deploy and manage virtualized application containers on a common operating system), forms an abstraction layer between the kernel and the program which can easily be controlled and duplicated. In combination with a running process snapshot tool, like Checkpoint/Restore In Userspace (CRIU—is a software tool for Linux operating system. Using this tool, it is possible to freeze a running application (or part of it) and checkpoint it as a collection of files on disk. The files can be used to restore the application and run it exactly as it was during the time of freeze) this becomes the perfect cloning tool for these purposes.

Let o be an object in which all in/out operations are done via inner process communication such as pipes, sockets or local files. It is possible to configure a container to mimic the environment of the program while redirecting the inputs and outputs to be controlled and examined by another container that is used to monitor the I/O. When a reflex request arrives, the container system API will be used to replicate the system state to a different container, in order to perform a reflex on the clone and resume the running of the original container.

This monitoring container approach allows testing the input-output relation that is expected to find in the program without actually investigating the implementation or current state details and even introduce different or unexpected inputs and observe the way the clone behaves.

Namely, the proposed framework enables run time testing capabilities without influencing the operation of the system. Just like the DevOp framework (DevOp is a software engineering practice that aims at unifying software development and software operation) that tries to avoid influencing the operation while allowing development, program reflexes, allows on-line testing without influencing the operation. Moreover, program reflexes may be used to check state/code changes to overcome problems in the operational version, switching a cloned version to be operational by additional redirection of inputs and outputs.

Obviously, using such a generic scheme leads to a more (time and space) expensive solution with relation to a tailored focused reflexes as described in the prior examples.

Orchestration Testing

The proposed framework may be used to apply the power of reflexes in the world of orchestration testing (i.e., testing how different parts of a program interact with each other).

In the proposed framework, controlling the flow of input/output to the tested parts can be easily done via the reflex monitor. The reflex monitor can check a specific subsystem for different input-output pairs and check to see how the following subsystem will react, as well as deliberately cause specific parts to fail and observe the resulting behavior.

Figure 3:
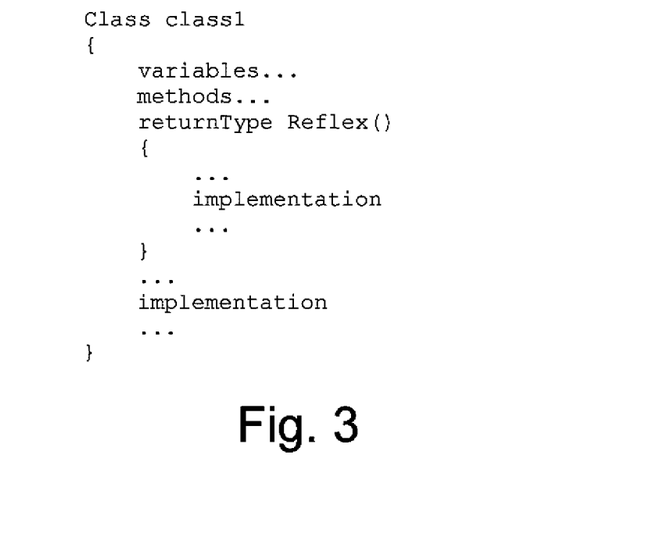
FIG. 3 schematically illustrates a class with implementation of reflexivity according to an embodiment of the present invention.
Figure 4:
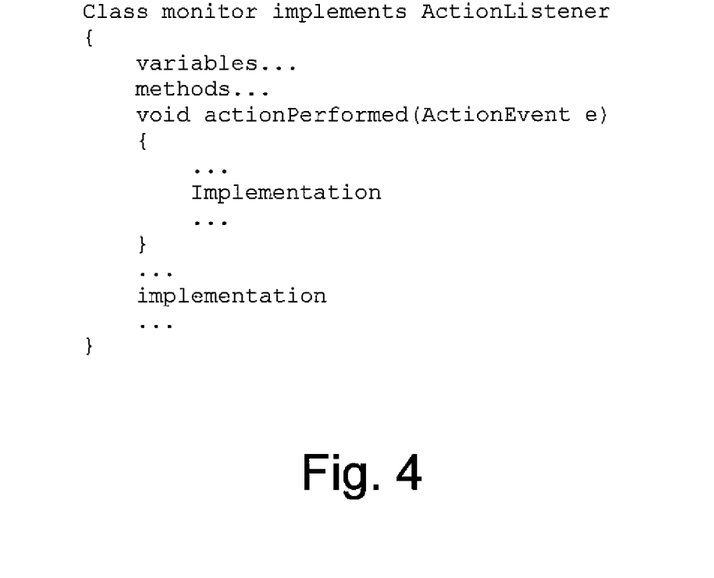
FIG. 4 schematically illustrates an implementation of a Reflex monitor according to an embodiment of the present invention.

FIG. 3 schematically illustrates a class with implementation of reflexivity according to an embodiment of the present invention. FIG. 4 schematically illustrates an implementation of a Reflex monitor according to an embodiment of the present invention.

Orchestration testing is quite different from the regular per module testing scheme since while each subsystem might function well on its own the concatenation of subsystems produces undesired functionality or even an erroneous state.

Verification Oriented Use Cases

The ideas behind the framework could be incorporated to any testing platform and give the programmer another indication of the quality of the software.

An automatic monitor could be added automatically to a debugging environment by adding an object (thread) that will call a reflex action once every predetermined amount of time and throw an exception if the program failed to report an "I am alive" statement.

A possible use-case may be in production environment and not just during the testing phases. Using the proposed mechanism, a well-designed program could reset any module that gets stuck or fails to meet a predicate when queried.

Machine Learning Related Use Cases

Machine learning techniques are often used as an integral part of systems. These usages range from tuning system operations to detecting anomalies (possibly caused by malware). Machine learning, and the task of behavior classification, can benefit from the capabilities of the reflexes. One can use reflexes to extract additional features from the flow of a program. These features might be expensive to record all the time but by using reflexes, it is possible to extract data only when the machine learning certainty in its classification falls below a certain threshold, thereby eliminating constant monitoring of the features. Another problem arises when trying to select the right features for a specific machine learning application. At times, it might be overwhelming to select among the (usually very large amount of) features available and typically a testing phase is required for the selection process. This feature selection process demands either the extraction of all the available information (if one knows what information is available beforehand) to a database and performing data-base queries on it or the insertion of specific feature extractors in the code and changing them each time for a new selection.

Both of these approaches are either space consuming or time consuming. Using reflexes in this context can be very useful since the code-injection hooks are present in the software and all that is needed is configuring them to extract the right information, a much easier task. Furthermore, the bookkeeping of a database is not required since not all the information must be extracted at once (reduces space requirements).

An upcoming sub-field in machine learning is the field of Active Learning, in which different aggregations of features are required, often in a dynamic manner. This field might benefit greatly from program reflexes since the features can be created in runtime and only when needed.

Runtime Correction

Runtime Correction is another possible ability of the reflex framework. Here, misbehaving or potentially harmful states are monitored and either reset, to a pre-defined state or individually remedy the state. These concepts hint at a new approach to designing software which maintains stability and fixes its own state (either automatically or by the request of an outside user). This concept is much more powerful than the regular input/output predicate check since it can also verify the state of the program with respect to the working environment and unexpected input/output pairs. These variations might be the result of user interaction, network errors or even the occasional power outage.

Designing the reflexes in a way which monitors prone to error parts of the program regularly, it is possible to break on purpose the unobtrusiveness and introduce a new ability of reflexes runtime correction. Such a technique could have saved the $125 million satellite sent with a bug to Mars in 1999. The NASA operators could have examined the components that were not functioning well and even could have fixed them using program reflexes.

Vehicle/Machinery on Line Input Simulation Prior to Application

Vehicles today are vastly dependent on software. The extent of the computerized system range from on-board entertainment system to fuel injection regulation and even steering control (for example see Checkoway et al., "Comprehensive experimental analyses of automotive attack surfaces", USENIX Security Symposium, San Francisco, 2011). The automotive industry keeps searching for ways to thoroughly test against all conceivable scenarios, and in particular zero-day cyber-attacks, but as it often happens in real-world security applications, identifying all the changeable variables is not easy.

Using reflex testing to identify the I/O channels of each subsystems of a vehicle might make it an easier and more manageable task. Furthermore, once the I/O channels are identified reflexes can be used to test a priori (on a replicated object, running on a virtual environment) the influence and consequences of any outside input/message/command prior to its processing in the vehicle itself, thereby reducing the likelihood of a zero-day attack that will endanger the vehicle users.

Possible Implementations of the Framework

The proposed framework was partially implemented and tested on Ubuntu (16.04) running Java (Oracle JDK 1.8), but similar technologies exist for most programming languages (with varying degrees of application complexity) and for most Linux flavours (which are Unix-like operating systems that have been developed based on the original UNIX) and even Windows environment.

The framework is designed in modules for the generalization of the implementation and for eventual simpler upgrading of the modules.

Main Module

This Module is the main body of the framework. The program to be made reflexable, as well as some configuration files, will be given as input to the module.

The module will either compile or receive an already compiled Java code which will be passed to the Injection Module for the instrumentation of the program and the addition of the reflexive capabilities.

The instrumented code will then be transferred to the Execution Module which will run the program alongside a Reflex Monitor Module.

INJECTION MODULE. The Injection Module will enable the programmer defined reflex to be inserted at the proper place without making the programmer work hard for it.

The present invention proposes a basic implementation in which the programmer is tasked with the job of defining the functions or objects to be injected. This can be either done via adding simple Java compilation annotation directive or by listing the injection points in a file which will be later passed to the module. The actual reflex functions can either be user written code or default reflexive actions.

Execution Module

The Execution Module allows for two approaches:

The first approach is a low-overhead program specific approach which runs the program on the host system using all the local configurations. This approach requires the programmer (or even a future implemented Verification Module) to make sure the reflex actions are unobtrusive to the program, i.e., running them can be modelled and proven by the definitions presented later on.

One option of implementation of this approach is the use of JVMTI, which is an API supplied with most JVM distributions which allows a programmer to access the internal structures of the JVM and get the state of an object (stacks, heaps, register, etc.) in the most absolute way. This ability makes it possible to completely duplicate an object or thread. In combination with Bytecode instrumentation to inject/change code while it is being loaded into the JVM provides the ability to sandbox objects and to test them using different inputs without duplicating the whole environment. Using these technologies, it is possible to greatly increase the power of reflexes to perform orchestration by eliminating the need to add a third party communication manager (like in the second approach). This solution is much more powerful than the trivial implementation and as such is very challenging to implement, since JVMTI needs to be implemented locally (compiled specifically to the environment in which the JVM runs), the API is complicated and requires a deep level of understanding of the JVM internal structure.

Second approach: A high-overhead general approach—runs the program in a sandboxed environment as proposed in VI. This approach utilizes the power of technologies such as Docker experimental functions and CRIU to run the program in a lightweight container system. When a reflex action is requested, the running container, as well as any running process inside the container, are halted momentarily and replicated. A new container is created to run the replica while replacing I/O channels from the original container to prevent the replica from changing the original program environment. This approach can also be done by using a fully functional VM hypervisor which allows the snapshot of running processes (or allows CRIU to run inside it). While regular VM hypervisors will take a very long time to clone and migrate the VM, De Lara et al. ("Virtual machine cloning as a first-class cloud primitive", ACM TOCS, 29(1): 2, 2011) presents a fast cloning technique and implementation based on Xen (Xen Project is a hypervisor using a microkernel design, providing services that allow multiple computer operating systems to execute on the same computer hardware concurrently-https://www.xenproject.org/, 2017) VM system. A mixture of these approaches is also a viable approach. It is possible to design specific reflex actions that will be proven to be unobtrusive which can run on the original program and some which require the second approach.

Reflex Monitor Module

One problem of the framework that might arise is when a reflex request is made but no value is returned. In such a situation, it is impossible to know for sure if the cause is independent of the system to be checked (maybe a network/connection error) or if the system malfunctioned. In order to separate the input arrival from the functionality, a Reflex Monitor Module is added, which will run on the same environment as the system, listen to the reflex request and perform the requested reflexive actions. The Reflex Monitor will inform the user that a reflexive action was received. This way, even if the communication component of the tested system is faulty, a reflex action will still be called. Since the Reflex Monitor runs locally on the same environment as the program, it is possible to use it to perform more complex operations than just bounce back a value such as orchestration.

The Reflex monitor is an object that acts as an orchestrator. It listens to inputs from an outside source (user, pre-configured timer or other error detecting systems), calls the reflex function of other objects, receives the response and monitors the states for errors. The power of the monitor lies in the order in which it can call the other objects. For example, the monitor can call the reflex functions in a way that should leave the total state of the system unchanged even though each individual operation might change the inner state of the object on which it was executed. The monitor can also hold the capability to copy the whole state of the object to a shadow copy and then activate the reflex on that copy, this allows for more obtrusive reflex actions while maintaining the regular flow of the original object.

This framework is proposed as an automated development tool that allows for the creation of this mechanism in a way that allows the developer to define the reflexive actions on a very high abstraction level (as opposed to defining every little action). Given a fully defined state chart of the program (allows the creation of a finite state machine modeling the program), also the automatic creation of reflex sequences performed by the monitor.

Verification Module

The verification module is a suggested model checker that checks the correctness of the user defined reflexive functions according to the formal definitions and high level task specifications. This module is capable of producing reflexive functions given (or by producing) formal specification of the program as an automata. The reflexive functions can be sought in such a model of the program by looking for execution loops.

Proof-of-Concept Implementation

A proof-of-concept implementation was created by applying the ideas presented in Section VI. The example was developed using Python 2.7 on a Ubuntu 16.04 machine (kernel 4.4.0-66) using Docker (version 17.03) and CRIU (version 2.6). The complete fully working example is available for download at GitHub (proof-of-concept implementation).

The example is based on Docker experimental features which are (as of the writing of these line) not fully supported by a Docker. These features include the checkpoint functionality, which saves the consistent state of the container and any running processes in it and the reload functionality which can use such a checkpoint at a later time to run a container from the exact same state. The checkpoint process is meant to be completely transparent to the container and the in-container processes.

The example is a Python script (executable reflex) which is operated inside a directory containing the executables to be tested, a Python class file which tests the executable and an optional Dockerfile that helps to set up the correct container environment for the executable.

A docker container is then created using the Dockerfile (if none is provided, the program is assumed to be a Java program and a Java suitable container is created), which also loads all the containing folder into the created container, compiles it and runs it inside the container. When a reflex request is made (Ctrl+R keyboard combination) the container is checkpointed (checkpointing is a technique to add fault tolerance into computing systems. It basically consists of saving a snapshot of the application's state, so that it can restart from that point in case of failure. This is particularly important for long running applications that are executed in failure-prone computing systems), duplicated and a new container is created with rerouted in/out channels (in/out is presumed, for the sake of simplicity of the example, to be a single TCP port communication). The communication channels are passed to the tester class to perform a test, after which an indication will be returned of whether to stop the testing or continue. If the indication was to continue the testing, a new container will be created from the checkpoint and the tester will receive the new container's in/out channels. The responsibility of creating a reasonable test for the running executable falls to the user of the system.

An Example of such executable, tester class and Dockerfile can be found in the GitHub repository https://github.com/rokacha/reflex. The repository has a c server which asks for a password, if the user fails to provide the correct password 3 times, the server will terminate the connection. The tester function will go through a list of possible passwords to test, if it fails to pass the server password check it will ask the reflex executable to provide another container and continue the testing.

The very slow execution of the system is caused partly because the functionality used is experimental and partly because a Docker is used. The system can be further optimized by applying the concepts shown in the high-overhead general approach section of the Execution Module (provides fast cloning without stopping the original environment), but it would require the move to a full VM.

Advantages of the Present Invention

Reactive Monitoring—while snapshots only examine the system state of a running executable at a point in time and in the scope of the current environment, reflexes are applicable to cases in which there is a need to test the program in a changing, not necessarily a priori known, dynamic environment.

Encapsulating the Implementation Details—The weak point of formal verification is the human-machine interface, either in the process of defining formal specifications or in composing predicates for consistency checks. It is required to avoid these tedious error prone processes and allow the examination of systems according to their high level functionality (input-output relations) that is independent of the implementation. Thus, allowing on-the-fly implementation changes without influencing the runtime reflex tests.

Orchestration—Orchestration testing is the task of examining how well different subsystems of a program work together. The proposed programming reflexes framework supports active monitoring of (functionality defined) subsystems and their orchestration by controlling inputs and outputs to and from subsystems while tracing and analyzing the behaviors.

On Demand Testing—Instead of constantly running active monitoring with the high cost of time and memory complexity overheads, it is possible to use the framework to actively monitor only when required. This allows selectively activating the monitor only in required cases, for example, when there is an indication that the software might be stuck or under stress.

Runtime Correction—Minor changes to the implementation of the framework can produce possible code injection/execution points. These points enable the insertion of automatically created or manually crafted correcting actions. When an erroneous behavior is detected, these actions could be activated in order to allow the system to recover and continue working from a correct (even if not up to date) state. This ability might be further extended and possibly correct the actual executable, thereby preventing future erroneous states.

The proposed framework provides a significant benefit over a conventional "if . . . then . . . else" check of the object state, since it does not require the programmer to delope deep into the many errors that can occur. It also saves considerable time in the quality assurance process of the code. This framework also allows testing process to be executed in parallel and while other objects still run (without stopping the whole system) as opposed to regular interrupt systems.

The proposed framework also provides the following capabilities:
Active verification monitoring synthesizing (series of) inputs to examine the correctness of the program executable and state in its environment, unlike passively collecting a snapshot of the system;
Verification with encapsulated details—checking the input-output relation independently of the implementation;
Verification orchestration checking subsystems functionality and the interplay between subsystems;
Verification on demand—allowing run time efficiency by activating verification activity only when required;
Correction in runtime—reflexes with handles for outside modifications of the executable and state. The program reflexes also opens up a whole new way to collect internal information of the running software that can be used in myriad of use cases besides the above mentioned use-case, for example as a feature of machine learning.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method for testing, during runtime, correctness of a computer program that controls a system and having one or more software modules, comprising the steps of:
   a) integrating a reflexive code of a reflex function into a code of said one or more software modules or into a virtual infrastructure that executes said computer program, said reflexive code is configured to verify the internal state and operation of said computer program and to provide, during runtime, on-demand indications regarding normal or abnormal operation of segments of said computer program;
   b) whenever desired or whenever the execution of one or more of said software modules is stuck, activating and executing said reflexive code by a system initiated input without interrupting the normal operation of said system or returning back to preceding instructions and regardless the current execution stage, and processing its corresponding output; and
   c) sequentially or parallelly determining the correctness of said one or more software modules of said computer program, according to processing results;
   d) forming an abstraction layer between a kernel and the program to be controlled and duplicated, for running the program in a lightweight container system, by:
      d.i) configuring a first container to mimic an environment of the program, to generate a clone environment;
      d.ii) redirecting inputs and outputs (I/O) to be controlled and examined by a second container, and monitoring the system I/O;
      d.iii) upon receiving a reflex request, replicating the system state to a different container;
      d.iv) activating said reflex function on said clone environment, while resuming the running of the first container, wherein on demand activation of the reflexive code for obtaining indications about whether or not for an executed code, a software module or a component functions properly is done sequentially or parallelly during runtime without affecting the program state, regardless where the program control currently is and regardless the current execution state of the said code, said software module or said software component, said on-demand activation is performed:
  i) on reflexive codes that have been already executed during said runtime, for obtaining indications about whether or not for an executed code, a software module or a component will function properly if re-executed during said runtime, or
  ii) on reflexive codes to be executed during said runtime, for obtaining indications about whether or not for an executed code, a software module or a component will function properly, before being executed during said runtime,
wherein whenever said computer executes a software component, allowing any other program components to be checked on-demand during runtime, without affecting the program state and regardless where the program control is, while other runtime checks are directed to the component that is currently being executed.

2. The method according to claim 1, wherein testing and checking the correctness of a computer program is performed automatically.

3. The method according to claim 1, wherein testing and checking the correctness of a computer program is performed on-demand.

4. The method according to claim 1, wherein a single reflexive action performs a reactiveness check for the entire system as a whole.

5. The method according to claim 1, wherein a system state is set of values defining the system at any point in time.

6. The method according to claim 1, wherein whenever a reflex request is made, obtrusive testing is made by:
  a) replicating a program environment; and
  b) running the reflex function on the replica.

7. The method according to claim 1, wherein integrating a reflexive code is made by:
  a) injecting hooks into the code; and
  b) on-demand introducing a reflex function at injection points.

8. The method according to claim 1, further comprising orchestration testing by:
  a) controlling the flow of input/output to the tested parts of a program; and
  b) activating a reflex function to check a specific subsystem for different input/output pairs, for detecting erroneous states.

9. The method according to claim 1, further comprising:
  a) accessing the state of an object or a thread and duplicating said object or thread; and
  b) testing correctness of said object or a thread by activating a reflexive function on the duplicate object or thread.

10. The method according to claim 1, wherein whenever a reflexive action is requested, performing the following steps:
  a) halting and replicating the running container and any running process inside said container; and
  b) creating a new container to run the replica, while replacing I/O channels from the original container to prevent the replica from changing an original program environment.

11. The method according to claim 1, wherein the computer program is selected from the group of:
  a hypervisor;
  an operating system; and
  an interpreter.

12. A system for testing, during runtime, correctness of a computer program that controls a system and having one or more software modules, comprising:
  a) at least one processor with a memory that stores:
    a.1) an Injection Module, for performing instrumentation of said program and for adding reflexive capabilities, to generate an instrumented code;
    a.2) an Execution Module for receiving said instrumented code which will run the program alongside a Reflex Monitor Module;
  b) said Injection Module is further operative for:
    b.1) defining reflexive code to be inserted at a predetermined place within said computer program or said one or more software modules, said reflexive code is configured to verify the internal state and operation of said computer program and to provide, during runtime, on-demand indications regarding normal operation of segments of said computer program, wherein on-demand activation of said reflexive code for obtaining indications about whether or not for an executed code, a software module or a component of said computer program functions properly is done during runtime without affecting the program state, regardless where the program control currently is and regardless the current execution state of the said code, said software module or said software component, said on-demand activation is performed:
      i) on reflexive codes that have been already executed during said runtime, for obtaining indications about whether or not for an executed code, a software module or a component will function properly if re-executed during said runtime, or
      ii) on reflexive codes to be executed during said runtime, for obtaining indications about whether or not for an executed code, a software module or a component will function properly, before being executed during said runtime;
    b.2) whenever desired or whenever the execution of one or more of said software modules is stuck, activating and executing said reflexive code by a system initiated input without interrupting the normal operation of said system or returning back to preceding instructions and regardless the current execution stage, and processing its corresponding output;
  c) said execution module is further operative for running said computer program on the host system using all local configurations, such that reflex actions are unobtrusive to said computer program;
  d) a reflex monitor module for separating input arrival from functionality by listening to a reflex request and performing requested reflexive actions; and
  e) a verification module for checking correctness of user defined reflexive functions by producing reflexive functions according to formal specification of the computer program as an automata,
wherein said at least one processor is adapted to form an abstraction layer between a kernel and the program to be controlled and duplicated, for running the program in a lightweight container system, by:
  i) configuring a first container to mimic an environment of the program, to generate a clone environment;

ii) redirecting inputs and outputs (I/O) to be controlled and examined by a second container, and monitoring the system I/O;
iii) upon receiving a reflex request, replicating the system state to a different container;
iv) activating a reflex function on said clone environment, while resuming the running of the first container, wherein whenever said computer executes a software component, allowing any other program components to be checked on-demand sequentially or parallelly during runtime, without affecting the program state and regardless where the program control is, while other runtime checks are directed to the component that is currently being executed.

13. The system according to claim 12, in which reflexive functions are detected by looking for execution loops in the program.

14. The system according to claim 12, in which the functions or objects to be injected by the injection module are determined by adding a Java compilation annotation directive.

15. The system according to claim 12, in which the functions or objects to be injected by the injection module are determined by listing injection points in a file, which will be later passed to said injection module.

* * * * *